United States Patent [19]

Shirasu et al.

[11] Patent Number: 4,710,604
[45] Date of Patent: Dec. 1, 1987

[54] MACHINING APPARATUS WITH LASER BEAM

[75] Inventors: Hiroshi Shirasu; Kazuhiro Shimeno, both of Yokohama; Joji Iwamoto, Kawasaki, all of Japan

[73] Assignee: Nippon Kogaku K. K., Tokyo, Japan

[21] Appl. No.: 942,730

[22] Filed: Dec. 17, 1986

[30] Foreign Application Priority Data

Dec. 20, 1985 [JP] Japan .................................. 60-287240
Jun. 19, 1986 [JP] Japan .................................. 61-144341

[51] Int. Cl.⁴ ........................ B23K 26/02; B23K 26/08
[52] U.S. Cl. ........................ 219/121 LU; 219/121 LP; 219/121 LY; 219/121 LZ; 356/358
[58] Field of Search .................. 219/121 LU, 121 LZ, 219/121 LP, 121 LH, 121 LJ, 121 LG, 121 LN, 121 LC, 121 LD, 121 LY; 356/358, 400, 401

[56] References Cited

U.S. PATENT DOCUMENTS 4,580,900 4/1986 Larsen ................................... 356/400
4,636,968 1/1987 Gotou et al. ..................... 356/401 X
4,659,225 4/1987 Takahashi ........................... 356/358

Primary Examiner—C. L. Albritton
Attorney, Agent, or Firm—Shapiro and Shapiro

[57] ABSTRACT

Proposed is a machining apparatus with a laser beam, wherein a stage is controlled and driven to cause a target to come close to a beam spot when the target is located far away from the beam spot, and a laser beam radiation system is controlled and driven to cause the beam spot to come closer to the target when the target is located within a predetermined range with respect to the beam spot.

14 Claims, 9 Drawing Figures

MACHINING APPARATUS WITH LASER BEAM

BACKGROUND OF THE INVENTION

1. Field of the Invention

The present invention relates to a laser machining apparatus for machining with a laser beam a workpiece placed on a movable stage.

2. Related Background Art

A conventional machining apparatus of this type is used as a semiconductor manufacturing apparatus. In particular, in a conventional machining apparatus for wafer repairing wherein a processed wafer is reprocessed with a laser beam, a wafer must be aligned with a laser beam radiation position with high precision at high speed.

Typical conventional methods of aligning a workpiece to a laser beam radiation position in a conventional machining apparatus are a method of shifting a stage which supports the workpiece and a method of shifting a laser beam radiation position by using an optical system such as a galvano mirror.

The method of shifting the stage has an advantage in that the stage can be aligned to the laser beam radiation position with high precision. However, due to a large mass of a workpiece carrying stage and its drive mechanism, high-speed alignment cannot be performed in this method.

The method of shifting the laser beam advantageously allows high-speed shifting of the laser beam. However, alignment precision for aligning the laser beam spot on a predetermined target position on the workpiece cannot be improved much.

SUMMARY OF THE INVENTION

It is an object of the present invention to provide a laser machining apparatus capable of performing high-speed alignment and improving alignment precision when a workpiece is aligned with a laser beam radiation position.

According to the present invention, there is provided a machining apparatus having an alignment system wherein a stage is controlled and driven such that a target on a workpiece placed on the stage is shifted toward a laser beam radiation position when the target is located away from the laser beam radiation position, and a laser beam radiation system is controlled and driven such that the laser beam radiation position is shifted toward the target when the target is located near the laser beam radiation position within a predetermined range.

With the above arrangement, if the target on the workpiece is located far away from the laser beam radiation position, the target can be easily shifted to a position near the laser beam radiation position with high precision. When the target actually comes near the laser beam radiation position, the laser spot is shifted onto the target. Therefore, the laser spot is shifted within a sufficiently small range. A drive element for shifting a laser beam LB may comprise an element with high precision. The laser beam radiation position can be aligned with the target with high precision at high speed.

DESCRIPTION OF THE PREFERRED EMBODIMENTS

An embodiment will be described wherein the present invention is applied to a semiconductor manufacturing apparatus.

Figure 1:
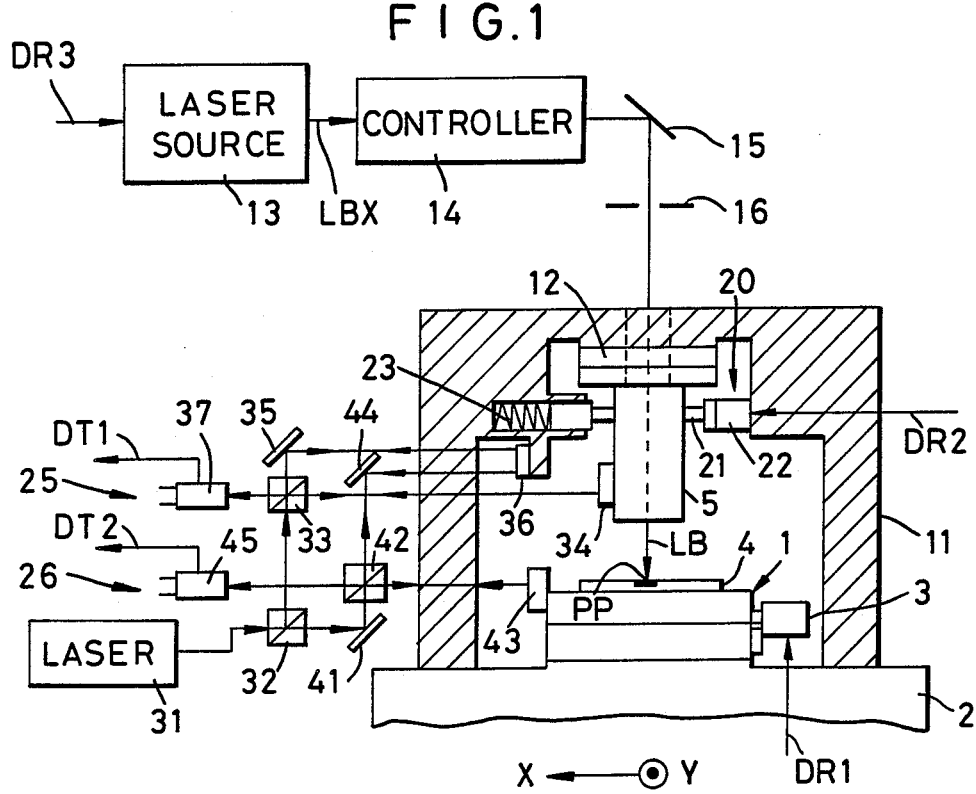
FIG. 1 is a longitudinal sectional view showing a mechanical structure of a machining apparatus according to an embodiment of the present invention.

Referring to FIG. 1, a wafer stage 1 mounted on a base 2 can be moved by a motor 3 in the X and Y directions.

A wafer 4 is chucked on the upper surface of the wafer stage 1 by vacuum suction and is adapted to receive a machining laser beam LB emitted from a radiation system 5.

The radiation system 5 comprises an objective lens system and is fixed on a stage 12. The stage 12 is disposed at the upper portion of a stand 11 fixed on a base 2. The radiation system 5 is located opposite the wafer stage 1, interposing the wafer 4 therebetween.

A laser beam LBX from a laser source 13 is input to a controller 14. The controller 14 controls the power of the input laser beam. The power-controlled laser beam is output as a laser beam LB from the controller 14 and is guided to the radiation system 5 through a mirror 15 and an aperture 16. The radiation system 5 focuses the laser beam LB having the same shape as that of the aperture 16 to form a laser spot on the wafer 4. The irradiated portion of the semiconductor wafer is processed with a laser beam.

The stage 12 holds the radiation system 5 to cause it to be movable along the X and Y directions. A drive mechanism 20 is arranged between the radiation system 5 and the stand 11 to move the radiation system 5 along the X or Y direction.

For driving along the X direction, the drive mechanism 20 comprises a bearing 21 which is fitted on the outer surface of the lens barrel of the radiation system 5. A drive element 22 and a compression spring 23 are mounted on the outer ends of the bearing 21 to support it. The drive element 22 comprises a piezoelectric element, one end of which is fixed to the stand 11. The bearing 21 is urged against the drive element 22 by the compression spring 23, one end portion of which is fixed to the stand 11.

When the drive element 22 extends/contracts against the biasing force of the compression spring 23 in proportion to a voltage applied to the element 22, the radiation system 5 is shifted along the X direction by a distance corresponding to the extension/contraction of the drive element 22.

A drive element and a compression spring are disposed for driving along the Y direction in the same manner as for in the X direction, thereby allowing shifting of the radiation system 5 along the Y direction.

A method of aligning a predetermined target PP on the wafer with the machining laser beams LB will be assumed below. One or both of a first method of causing the motor 3 to shift the wafer stage 1 along the X and-/or Y direction and a second method of causing the drive mechanism 20 to shift the radiation system 5 along the x and/or y direction are used. The relative positional relationship between the wafer 4 and the radiation system 5 is then updated to achieve alignment.

Figure 2:
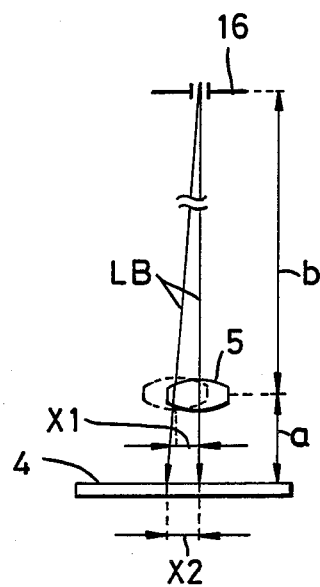
FIG. 2 is a schematic diagram showing a moving state of a laser beam radiation position when the radiation system is shifted.

If the objective lens system constituting the radiation system 5 is moved by a distance X1 from the position indicated by the solid line to the position indicated by the broken line in FIG. 2, a displacement X2 of the beam radiation position on the wafer 4 is represented as follows:

$$X2 = X1(1 - a/b)$$

where a is the distance between the radiation system 5 and the wafer 4, and b is the distance between the aperture 16 and the radiation system 5.

The relationship between the distances a and b satisfies the following inequality so as to set the spot size of the laser beam LB on the wafer to be about several micrometers:

$$b \gg a$$

For example, a ratio of the distance b to the distance a is given as follows:

$$b:a = 100:1$$

If the displacement X2 of the laser beams is as small as $X2 \approx X1$, the displacement X2 of the laser beam LB is assumed to be substantially the same as the displacement X1 of the radiation system 5.

Under this condition, light rays passing through the objective lens of the radiation system 5 pass through the optical axis of the lens. Therefore, these rays do not substantially influence lens performance.

This is also true along the Y direction.

The X-Y radiation position of the laser beam from the radiation system 5 and the X-Y position of the wafer are respectively measured by interferometers 25 and 26.

The interferometer 25 for the radiation system 5 is designed such that an output beam having a stabilized wavelength and emitted from a laser 31 is incident on a detection mirror 34 fixed on the outer surface of the radiation system 5 after sequentially passing through beam splitters 32 and 33, and that a beam reflected by the mirror 34 is received again by the beam splitter 33. At the same time, in the interferometer 25, the output beam from the laser 31 is incident on a reference mirror 36 disposed at the reference position of the stand 11 through the beam splitters 32 and 33 and a mirror 35, and that the reflected beam is returned to the beam splitter 33 through the mirror 35.

The beam splitter 33 outputs a beam derived from an interference between the beam reflected by the reference mirror 36 and the beam reflected by the detection mirror 34. The interference beam is incident on a photoelectric sensor 37. The intensity of the interference beam is changed on the basis of a difference between the X coordinate of the reference mirror 36 and the X coordinate of the detection mirror 34 when the displacement of the radiation system 5 is changed. A detection pulse DT1 corresponding to the displacement is supplied from the photoelectric sensor 37 according to the change in intensity of the beam.

The respective optical elements are disposed such that the beam incident on the detection mirror 34 coincides with a nodal point of the exit side of the objective lens of the radiation system 5 along an extended line of the optical axis. With this arrangement, the displacement of the machining laser beam can be accurately detected regardless of the magnitude of the displacement of the objective lens.

In the interferometer 26 for the wafer 4, the output beam from the laser 31 is incident on a detection mirror 43 fixed on the outer surface of the wafer stage 1 through the beam splitter 32, a mirror 41, and beam splitter 42. The reflected beam is received again by the beam splitter 42. At the same time, the output beam as a detection beam from the laser 31 is incident on the reference mirror 36 through the beam splitter 32, the mirror 41, the beam splitter 42, and a mirror 44, and the beam reflected by the mirror 36 is returned to the beam splitter 42 through the mirror 44.

The beam splitter 42 outputs a beam derived from an interference between the beam reflected by the detection mirror 43 and the beam reflected by the reference mirror 36. A change in interference beam is detected by a photoelectric sensor 45. The photoelectric sensor 45 generates a detection pulse DT2 corresponding to the displacement of the wafer 4 upon detection of the detection mirror 43 with respect to the reference position of the reference mirror 36.

In this manner, detection pulses DT1 and DT2 which respectively represent the displacement of the radiation system 5 and the displacement of the wafer 4 with respect to the reference position formed in the reference mirror 36 are derived from the interferometers 25 and 26. The drive controller of the radiation system 5 and the wafer stage drive controller are controlled in response to the detection pulses DT1 and DT2, and the target on the wafer 4 can be aligned with the spot position of the machining laser beam LB.

The position of the machining beam LB, which is given such that the radiation system 5 is located at the origin of the X-Y plane, and the X-Y position of the reference mark formed on the wafer 4 are measured by a measuring device beforehand. In addition, the positional relationship between the target PP on the wafer 4 and the reference mark formed on the wafer 4 is accurately measured as the design values or the measurement results. Since the X-Y positional relationship between the target PP on the wafer and the machining laser beam LB is already known, the X- and Y-direction distances corresponding to the positional deviations are set to be target values. The wafer stage 1 and the radiation system 5 and shifted along the X and Y directions so as to set the target values to be zero, thereby achieving accurate alignment control.

Figure 3:
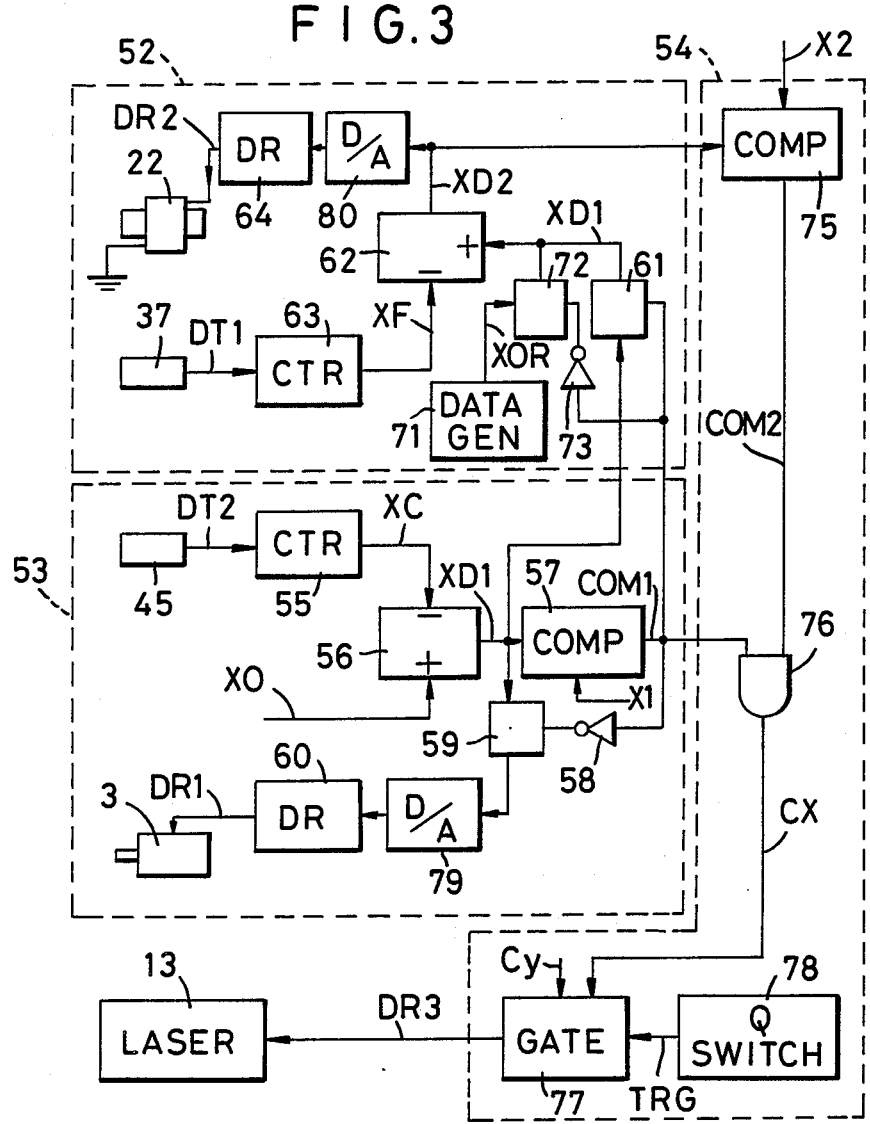
FIG. 3 is a block diagram of a controller for controlling the machining apparatus in FIG. 1.

Such alignment control is performed by the drive controller shown in FIG. 3. Only the X drive control system is illustrated in FIG. 3. However, the Y drive control system is arranged in the same manner as the X drive control system.

The drive controller comprises a control block 52 for the radiation system 5, a control block 53 for the wafer stage 1, and a control block 54 for the machining laser source 13.

In the stage control block 53, a counter 55 receives the detection pulse DT2 from the photoelectric sensor 45, and a count output Xc from the counter 55 is supplied to the inverting input terminal of a subtracter 56. The count output Xc represents the current position of the wafer stage on the X-axis. A target value X0 representing the X-direction displacement is input to the noninverting input terminal of the subtracter 56. A difference output XD1 ($=C0-Xc$) is supplied to a comparator 57.

Figure 4:
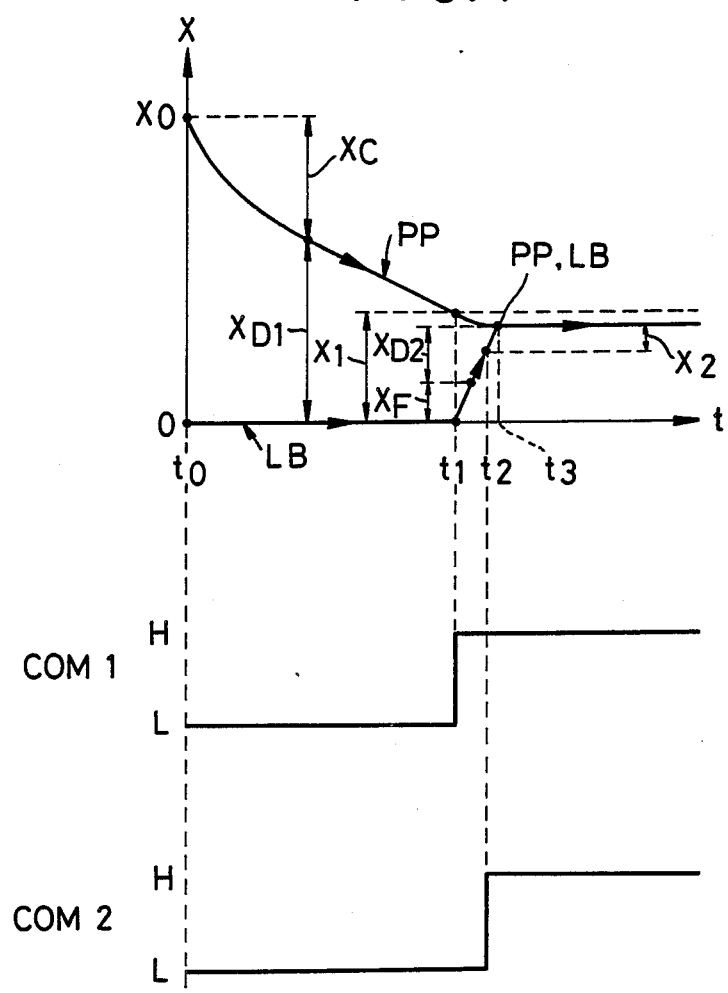
FIG. 4 is a timing chart for explaining alignment between the target and the laser spot.

The difference output XD1 from the subtracter 56 represents a relative difference between the position of the machining laser beam LB and the position of the target PP on the wafer 4, as shown in FIG. 4. The relative difference XD1 is gradually decreased from the value XD1 $=$X0 at the correction start time t$=$t0 when the mount output Xc from the counter 55 is increased and comes close to the target value X0. When the count output Xc from the counter 55 reaches the target value X0, the difference output XD1 becomes zero, thereby indicating that alignment operation is completed.

The comparator 57 compares the difference output XD1 with a reference signal X1. If the content of the difference output XD1 is larger than that of the reference signal X1, the comparator 57 generates an output COM1 maintainin/g logical "L" level. The reference signal X1 represents the content of the difference output XD1 at a timing when an alignment mode for shifting the wafer stage 1, i.e., the stage feed mode is switched to an alignment mode for shifting the radiation system 5, i.e., the radiation system feed mode. The magnitude of the reference signal X1 is determined in the following manner. When the difference output XD1 comes close to zero and becomes smaller than the value X1, the logical level of the output COM1 is inverted to H level.

The output COM1 is supplied to a gate circuit 59 through an inverter 58. If the output COM1 is set at logical "L" level, the gate circuit 59 is enabled to supply the difference output XD1 to the motor driver 60 through the gate circuit 59 and a D/A converter 79. Therefore, the motor 3 is continuously driven.

In this state, when the output COM1 goes to logical "H" level, the gate circuit 59 is disabled to stop the motor 3 through the motor driver 60.

The difference output XD1 from the subtracter 56 is supplied to the noninverting input terminal of a subtracter 62 through a gate circuit 61 in the radiation control block 52.

In the control block 52, a counter 63 counts the detection pulses DT1 from the photoelectric sensor 37, and a count output XF therefrom is supplied to the inverting input terminal of the subtracter 62.

A difference output XD2 appearing at the output terminal of the subtracter 62 is supplied to a driver 64 through a D/A converter 80. In this case, the driver 64 supplies a drive output DR2 to the drive element 22. The radiation system 5 is driven until the count output XF from the counter 63 coincides with the value at the noninverting input terminal.

When the difference output XDL from the subtracter 56 reaches the mode switching level X1 in FIG. 4, data representing the relative difference between the target value X0 and the position Xc of the wafer 4, i.e. XD1 ($=$X1) is supplied to the noninverting input terminal of the subtracter 62, and the radiation system 5 is driven until the count output XF from the counter 63 coincides with the difference output XD1 ($=$X1).

In addition to the above arrangement, the radiation control block 52 also includes an arrangement wherein reference data XOR from a data generator 71 is supplied to the noninverting input terminal of the subtractor 62 through a gate circuit 72. The output COM1 from the comparator 57 is supplied as an enable control signal through an inverter 73. The gate circuit 72 is enabled/disabled in a manner opposite to the gate circuit 61.

While the output COM1 is set at logic "L" and therefore the gate circuit 61 is kept disabled, the gate circuit 72 is enabled to supply the reference position data XOR to the subtracter 62. As a result, the driver 64 drives the drives the drive element 22 to determine the radiation position of the machining laser beam LB on the basis of the reference position data XOR. In this embodiment, the reference position data represents a value for allowing radiation of the machining laser beam LB on the origin of the X-Y coordinate system. While the stage control block 53 performs accurate positioning of the wafer stage 1, the radiation control block 52 performs accurate positioning of the machinging laser beam LB at the origin.

The difference output XD2 from the subtracter 62 is supplied to a comparator 75 in the laser control block 54. The comparator 75 generates an output COM2 which goes to logical "H" level when the difference output XD2 becomes smaller than a reference signal X2. The output COM2 is supplied to the input terminal of a gate circuit 76.

The value of the reference signal X2 is determined to a signal level representing that the position of the laser beam LB falls within the allowable machining range.

The gate circuit 76 receives the outputs COM1 and COM2. If alignment operations for the stage 1 and the radiation system 5 are completed along the X-axis and the outputs COM1 and COM2 go to logic "H" level, the gate circuit 76 supplies a signal Cx of logical "H" level to a gate circuit 77. The signal Cx of logical "H" level represents that the X-axis alignment is completed.

A Y-axis controller (not shown) having the same arrangement as the blocks 52 and 53, the comparator 75, and the gate circuit 76 in FIG. 3 is arranged for Y-axis alignment. A signal Cy representing the completion of the Y-axis alignment is supplied to the gate circuit 77.

When the gate circuit 77 is enabled, a trigger output TRC from a laser Q switch trigger oscillator 78 is supplied to a machining laser 13. The laser 13 generates a laser beam LBX (FIG. 1) to emit the machining laser beam LB onto the wafer 4.

With the above arrangment, the machining laser beam LB is located at origin O at time t0 in FIG. 4. As the same time, a target PP on the wafer 4 is located at a position corresponding to a target value X0. In this state, the stage control block 53 is driven. More specifically, at time t0 when the wafer state 1 is not moved the photoelectric sensor 45 does not generate a detection pulse DT2. The count output XC from the counter 55 represents zero. The difference output XD1 from the subtracter 56 is set to be the target value X0 and is larger than the value represented by the reference signal X1 from the comparator 57.

The output COM1 is set at logical "L" level, and the gate circuits 59 and 72 are kept enabled, while the gate circuits 61 and 76 are kept disabled.

When the drive output DR1 is supplied from the motor driver 60 to the motor 3, the target PP on the wafer 4 is moved to a point (i.e., the origin) where the target PP can be irradiated with the machining laser beam LB. When the photoelectric sensor 45 generates a detection pulse DT2 representing the displacement of the target PP, the count output Xc of the counter 55 is gradually incremented, and the differences output XD1 is gradually decremented to zero.

In this manner, the position of the target PP on the water 4 comes close to the radiation position of the machining laser beam LB together with the wafer stage 1. In this operation mode, the reference position data XOR from the data generator 71 is supplied to the subtracter 62 in the radiation control block 52. The drive output DR2 is supplied from the driver 64 to the drive element 22 such that the count of the counter 63 comes close to the origin position represented by the reference position data XOR. As a result, the machining laser beam LB maintains a state wherein the origin can be irradiated with the beam LB.

At time t1, when the difference output XD1 is smaller than the reference signal X1, the output COM1 from the comparator 57 goes to logical "H" level. In this state, the gate circuits 59 and 72 are disabled, and the gate circuits 61 and 76 are enabled.

The drive output DR1 is not supplied to the motor 3 any longer. After the lapse of time t1, the target PP on the wafer 4 stops after the wafer stage 1 and the associated drive mechanism lose their inertia.

The subtracter 62 in the radiation control block 52 receives the difference signal XD1 from the subtracter 56 through the gate circuit 61, instead of ter reference position data XOR. The difference output XD2 from the subtracter 62 is abruptly changed to a value corresponding to the difference between the radiation (i.e. the origin) of the machining laser beam LB and the value represented by the difference output XD1 from the subtracter 56. The drive output DR2 is sent from the drive 64 to the drive element 22. Therefore, the radiation position of the laser beam LB is shifted toward the position of the target PP from time t1. The displacement of the beam spot is detected by the detection pulses DT1 generated by the photoelectric sensor 37. The count of the counter 63 is gradually increased, while the difference output XD2 is gradually decreased.

At time t2, when the difference output XD2 from the subtracter 62 becomes smaller than the reference signal X2 from the comparator 75, the output COM2 goes to logical "H" level. Upon updating of the output COM2, the signal Cx is supplied from the gate circuit 76 to the gate circuit 77, and the gate circuit 77 is enabled. A drive output DR2 is supplied to the machining laser 13 on the basis of an output TRG from the trigger oscillator 78.

In this case, if the signal Cy is also output, the wafer 4 is irradiated with the machining laser beam LB. The position of the laser beam B falls within the allowable laser radiation range represented by the reference signal X2. Therefore, the target PP on the wafer 4 is machined with the laser beam LB.

After such machining is completed, and at time t3, when the radiation position of the machining laser beam LB coincides with the target PP, the difference output XD2 becomes zero. A change in drive output DR2 supplied from the driver 64 to the drive element 22 is interrupted. The target PP is kept aligned with the laser beam LB.

When machining for one target PP is completed the value represented by the target position input X0 in the stage control block 5 is updated to the contents designating the position of the next target PP. In this case, the output COM1 goes to logical "L" level, and another alignment cycle of the motor driver 60 is started. At the same time, the machining laser beam LB is kept at the origin by the driver 64.

According the arrangement of the above embodiment, when a difference between the position of the target PP and the radiation position of the machining laser beam LB is large, the wafer stage 1 is driven to shift the target PP on the wafer 4 to the radiation position of the machining laser beam. As a result, when the position of the target PP comes close to the machining laser beam, driving of the wafer stage 1 is interrupted. At the same time, the spot of the machine laser beam LB is shifted. By shifting the wafer stage for driving over a long distance, shifting at high speed can be performed. At the same time, after the wafer stage having a larger inertia is stopped, the position of the laser beam LB is shifted by using the laser beam drive element 22 having a high response time. As a result, the laser beam LB can be aligned with the target PP with high precision.

The drive range of the driver element 22 can be minimized, and thus an element suitably operated within the narrow range but with high precision can be used as the drive element 22. Therefore, the alignment between the machining laser beam LB and the target PP can be achieved with high precision in practical application.

The same effect as in the above embodiment can be obtained even if the driver mechanism 20 in FIG. 1 comprises a mechanism wherein a laser beam is shifted in the X and Y directions by a galvano mirror, a rotational parallel flat glass plate or the like until the machining laser beam is incident on the radiation system 5.

When the radiation system 5 performs alignment of the laser beam with the target PP, the wafer stage drive motor 3 is not stopped but continuously driven to align the radiation position of the machining laser beam LB with the target PP, and at the same time the machining laser beam LB is irradiated, thereby achieving alignment at a higher speed. An embodiment constituted on the basis of the above assumption will be described below.

Figure 5:
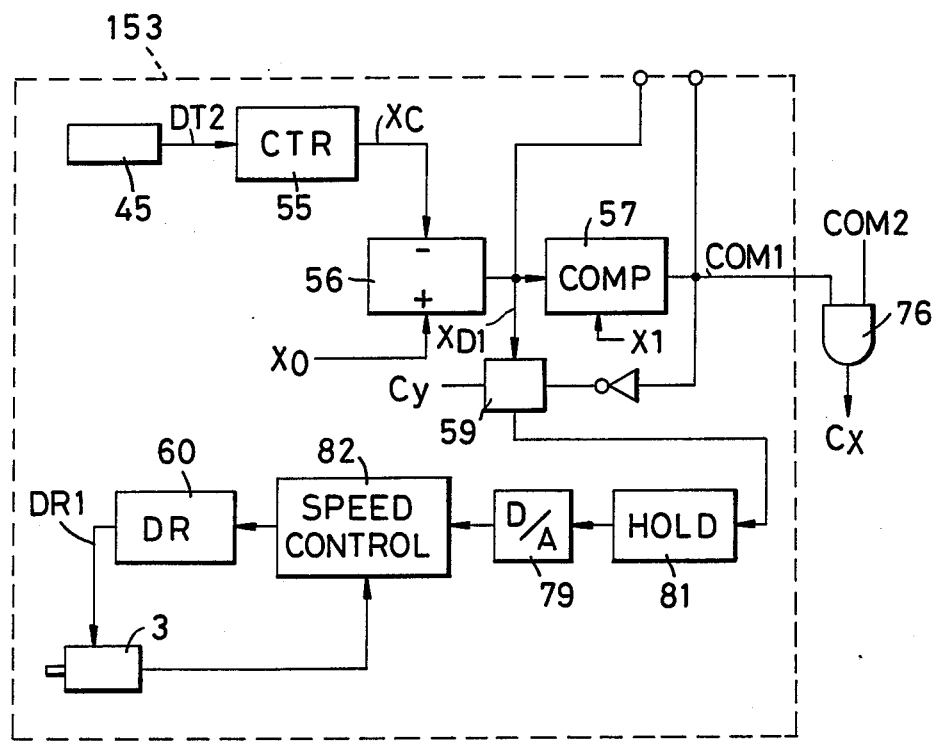
FIG. 5 is a block diagram of a stage control section in a controller according to another embodiment of the present invention.

A circuit 153 in FIG. 5 has an arrangement obtained by partially modifying the stage control block 53 in FIG. 3. Other constructions of the circuit 153 are the same as those of the block 53. According to this embodiment, when a target PP is located far away from the radiation position of a laser beam LB, the stage is fed at high speed to cause the target PP to come close to the radiation position at high speed. When the target PP comes close to the radiation position, the state is shifted at a predetermined low speed, and at the same time, the machining laser beam LB is shifted toward the target PP. Alignment between the target PP and the machining laser beam LB can be performed with high precision at high speed.

Referring to FIG. 5, a signal Cy generated upon completion of the Y-axis alignment of a stage 1 is input to a gate circuit 59 for controlling gating of an output XD1 from a subtracter 56.

The gate circuit 59 is kept enabled regardless of the logical level of the signal Cy representing the completion of Y-axis alignment if the output COM1 is kept at logical "L" level. However, if both the output COM1 and the signal Cy are set at logical "H" level, the gate circuit 59 is disabled.

When the gate circuit 59 is enabled, the difference output XD1 is supplied to a motor driver 60 through the gate circuit 59, a hold circuit 81, a D/A converter 79, and a speed control circuit 82, thereby continuing driving of the stage drive motor 3.

The hold circuit 81 holds the difference output XD1 from the gate circuit 59 and sends it to the D/A converter 79. When both the outputs COM1 and COM3 are set at logical "H" level, and the gate circuit 59 is disabled, i.e., when the difference output XD1 is not received by the hold circuit 81 any longer, the immediately preceding difference output XD1 is sent to the D/A converter 79.

Figure 6:
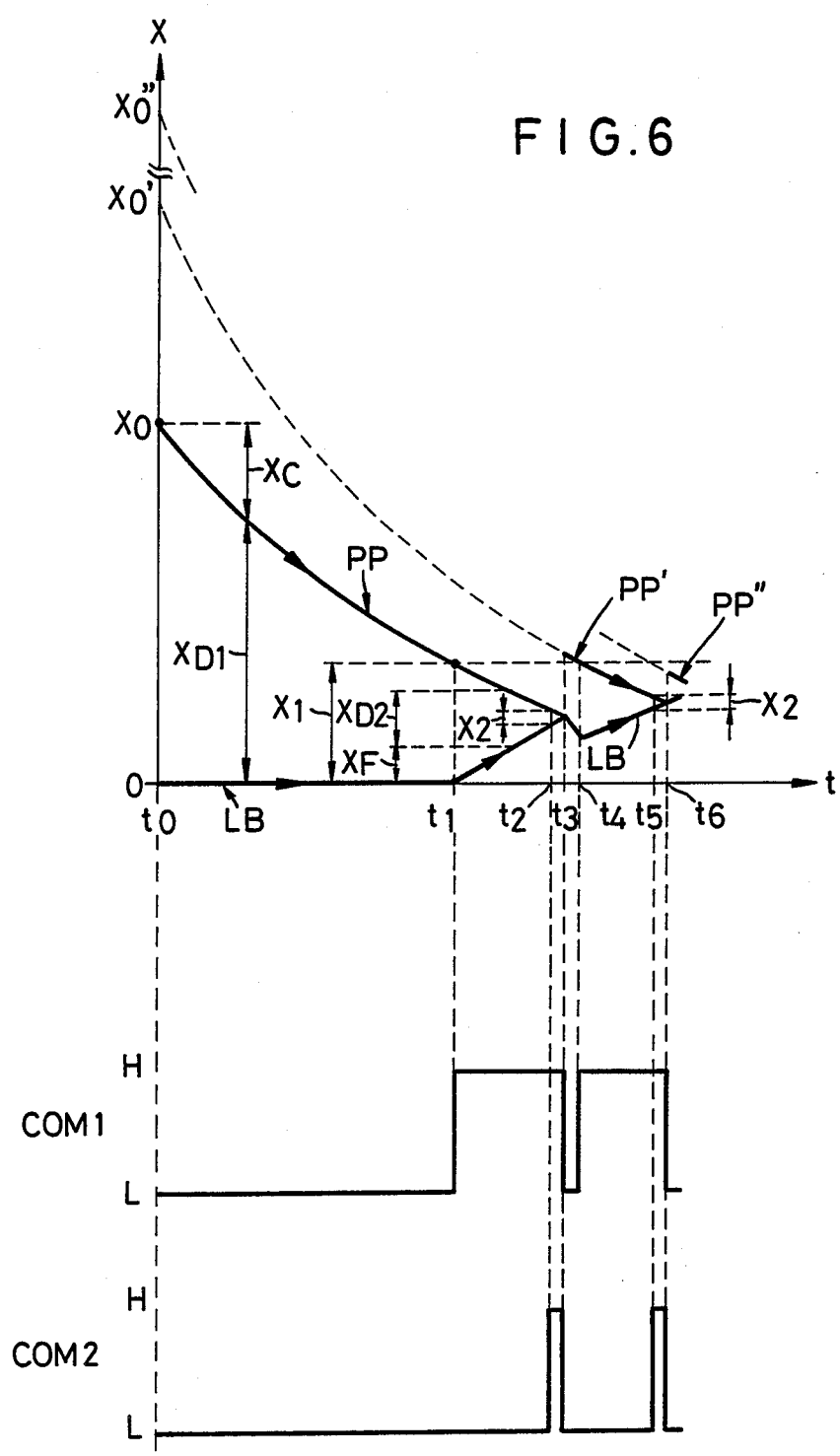
FIG. 6 is a timing chart for explaining alignment by using the apparatus in FIG. 5.

With the arrangement described above, at time t0 in FIG. 6, Y-axis alignment or positioning has been completed and the relative displacements of the stage 1 and the beam radiation system 5 along the Y-axis have been interrupted. The signal Cy of logical "H" level is input to the gate circuits 59 and 77. At this time, the laser beam LB is located at the origin O along the X-axis, and the target PP on the wafer 4 is located at the position of the target value X0. In this state, the stage control block 153 in FIG. 5 is started. At time t0, the output Xc from the counter 55 is set to be zero, and therefore the output XD1 from the subtracter 56 is the target value X0 which is larger than the reference signal X1. The output COM1 from the comparator 57 is set at logical "L" level. Therefore, the gate circuits 59 and 72 are enabled and the gate circuits 61 and 76 are disabled.

In this state, the difference output XD1 from the subtracter 56 is converted by the D/A converter 79 into an analog signal through the gate circuit 59 and the hold circuit 81. The analog signal is supplied to the speed control circuit 82. The speed control circuit 82 generates a speed control signal corresponding to this analog signal. The speed control signal is sent to the motor driver 60. The motor driver 60 generates the drive output DR1 obtained by amplifying the speed control signal. The motor 3 is started and the target PP on the wafer is shifted toward a point where the target PP can be irradiated with the machining laser beam LB, i.e., toward the origin O along the X-axis. While the motor 3 is rotated, the speed control circuit 82 receives a speed signal representing a rotational speed from a tachogenerator built into the motor 3. The speed control circuit 82 performs control such that the speed control signal generated on the basis of the difference output XD1 corresponds to the speed signal. If a distance difference representing the difference signal XD1 is smaller, the motor 3 and hence the stage 1 are driven at a lower speed. Eventually, when the distance difference becomes zero, the motor 3 is stopped.

The target PP on the wafer 4 comes close to the radiation position in the same manner as in FIG. 4.

At time t1, the gate circuits 59 and 72 are disabled, and the hold circuit 81 causes the drive output DR1 to the motor 3 to be constant. Therefore, the target PP on the wafer 4 is driven at a predetermined low speed. This speed can be set to cause the radiation system 5 to sufficiently monitor movement of the target PP.

During the period between times t1 and t2, the output DR2 is supplied from the driver 64 to the drive element in the same manner as in FIG. 4, so that the radiation system is shifted toward the target.

At time t2, the output COM2 from the comparator 75 goes to logical "H" level. In this case, since the signal Cy of logical "H" level is supplied to the gate circuit 77, the gate circuit 77 is already enabled. The drive output DR3 is sent to the machining laser 13 in response to the trigger output TRG from the laser Q trigger oscillator 78.

At time t3, working on one target PP is completed. The target position input X0 is updated to a target value X0' (in this case, the Y-axis value is not changed) designating the position of the next target PP'. A difference output XD1 representing a difference between the target position input X0' and the counter output Xc representing the current position of the stage 1 is larger than the reference signal X1. The output COM1 from the comparator 57 goes to logical "L" level. In the same manner as in the operation during the period between times t0 and t1, alignment for the new target position X0' is started by the motor driver 60.

Since the comparison output COM1 is set at logical "L" level, the gate circuit 72 is enabled while the gate circuit 61 in FIG. 3 is disabled. The reference position data XOR is supplied to the subtracter 62. As a result, the drive element 22 is driven by the driver 64 to start returning of the radiation position of the laser beam LB to the origin.

At time t4, the difference output XD1 becomes lower than the reference signal X1. The motor 3 is controlled in response to the constant output DR1, and the target PP' is driven at a constant low speed. At the same time, the radiation system is controlled in response to the output DR2, and the spot position of the laser beam LB is shifted toward the position of the target PP'.

If the distance between the target PP and the radiation position of the laser beam LB is large, the wafer stage 1 is driven at high speed to immediately move the target PP toward the radiation position. When the target PP comes close to the radiation position of the laser beam LB, the wafer stage 1 is continuously driven at a constant low speed, while the laser beam LB is shifted toward the position of the target PP. Therefore, the wafer stage is driven when the distance between the target and the laser beam LB is large. When the distance is very short, the laser beam LB is also moved by using the drive element 22 having a relatively high response time. As a result, alignment between the target and the laser beam can be performed with high precision at high speed.

In the apparatus of FIG. 1, the optical path of the laser beam generated by the laser source 13 must be adjusted to pass through the central position of the aperture 16. If the optical path is deviated from the central position, the laser beam is partially shielded by the aperture to result in shortage of laser energy or change the sectional energy distribution of the laser beam, thereby degrading machining precision.

The intensity of the laser beam LB passing through the central position of the aperture and emitted onto the workpiece is defined by a substantially symmetrical Gaussian distribution. However, when the optical path of the laser beam is deviated from the central position of the aperture, sufficient energy cannot be obtained. In addition, the light intensity distribution becomes asymmetrical, and thus eccentric machining may be performed.

The deviation of the beam from the aperture is caused by changes in thermal conditions of the laser source, deteriorations over time, and changes in optical axis position at the time of maintenance.

An embodiment will be described to correct a change in optical path of the laser beam with respect to the beam shaping aperture.

Figure 7:
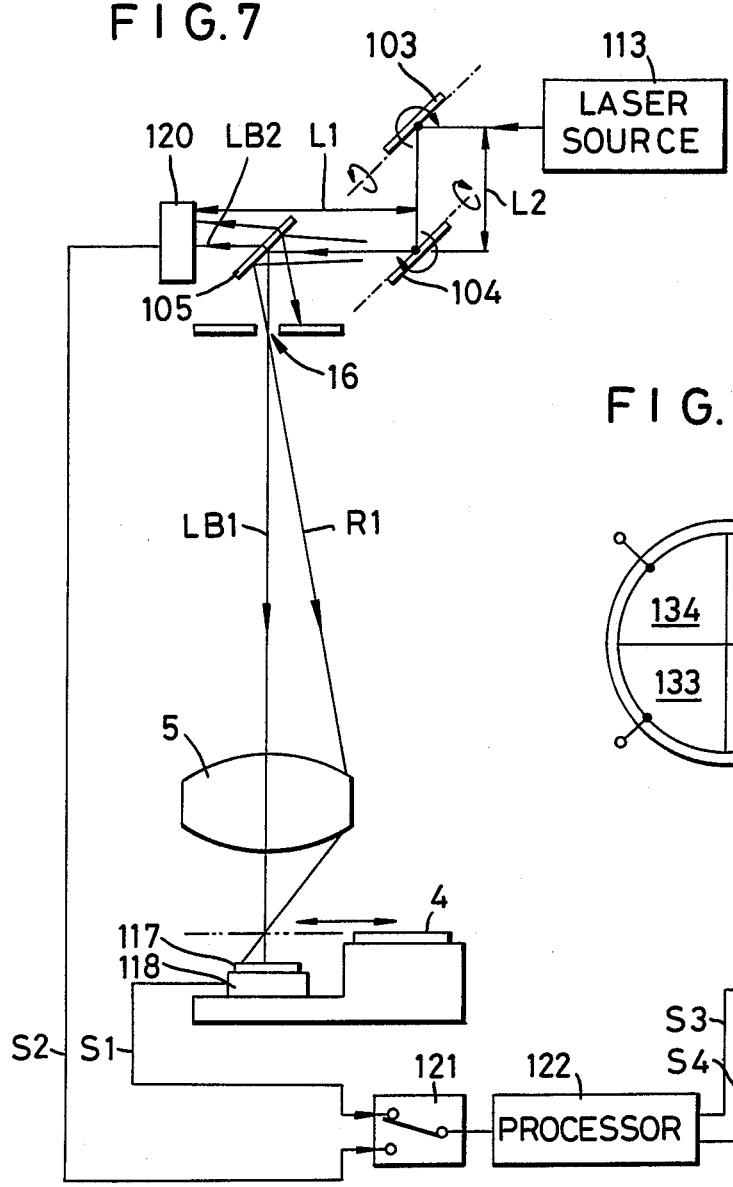
FIG. 7 is a schematic diagram of a laser beam radiation position adjustment device.

Referring to FIG. 7, a laser beam LBX generated by a laser source 113 is reflected by, e.g., a gimbal mirror 103, and the reflected beam is incident on a gimbal mirror 104.

The laser beam reflected by the mirror 104 is incident on a half mirror 105. A laser beam LB1 reflected by the half mirror 105 is focused by an objective lens 5 through an aperture 16, and the beam spot is formed on a stage 101 on which a workpiece 4 is placed.

The stage 101 is controlled by a drive controller in the same manner as in the previous embodiments. The stage 101 has a beam adjustment table having a level lower than that of the workpiece. A beam position sensor 118 having an ND (Neutral Density) filter 117 is mounted on the beam adjustment table. The ND filter 117 is designed to match the amount of laser beam LB1 with the sensitivity of the beam position sensor 118.

An image of the aperture 16 which is formed by the objective lens 5 is defocused with respect to the surface of the beam position sensor 118.

If the laser beam LB1 passes through an object lens optical axis coinciding with the center of the aperture 16 and is incident on the beam position sensor 118, the energy distribution of the laser beam image on the beam position sensor has a symmetrical distribution about the center of the optical axis.

However, if the laser beam LB1 is deviated from the center of the aperture 16 and is incident on the objective lens 5 through an optical path R1 inclined with respect to the optical axis, the energy distribution of the laser beam image on the beam position sensor 118 is deviated away from the optical axis. The sensor 118 generates a detection signal S1 representing the direction and amount of deviation of the beam LB1 from the center of the sensor 118. The detection signal S1 is supplied to a processor 122 through a switching circuit 121.

In addition to the arrangement described above, a laser beam LB2 passing through the half mirror 105 is incident on a beam position sensor 120. The beam position sensor 120 is located at a position equivalent to the aperture 16 and generates a detection signal S2 representing the direction and amount of deviations of the laser beam LB2 from the center of the sensor 120.

The detection signal S2 is supplied to the processor 122 through the switching circuit 121.

Figure 8:
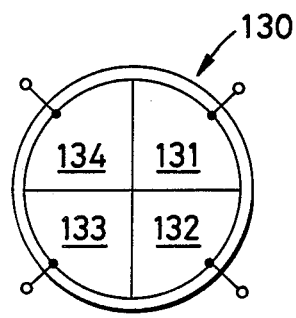
FIG. 8 is a plan view of a beam position sensor in FIG. 7.

Each of the beam position sensors 118 and 120 comprises a four-split sensor 130 shown in FIG. 8. When a laser beam is incident on the central position of four element 131 to 134, identical outputs are generated by the four elements 131 to 134. However, if the optical path of the laser beam is deviated from the center, elements located in the beam-deviated direction generate larger outputs than other elements.

The processor 122 receives the detection signals S1 and S2 supplied through the switching circuit 121, and generates signals S3 and S4 which represent the direction and amount of deviations of the laser beam from the center. The signals S3 and S4 are displayed on display units 123 and 124, respectively.

With the above arrangment, the position of the laser beam LB1 with respect to the aperture 16 is displayed on the display unit 124.

The position of the laser beam LB1 with respect to the optical axis is displayed on the display unit 123. The gimbal mirrors 103 and 104 are independently rotatable about two axes (first and second axes) perpendicular to each other to deflect the laser beam LB1 in the X and Y directions upon rotation of the mirrors 103 and 104 along the first and second axes.

If a pivot angle of the mirror 103 is given as $\theta 1$, a beam shift amount r1 of the laser beams LB1 and LB2 upon operation of the mirror 103 is defined as follows:

$$r = 2\theta 1(L1 + L2) \qquad (1)$$

where L1 is the distance from the mirror 104 to the beam position sensor 120 (therefore, the aperture 16), and L2 is the distance between the mirrors 103 and 104.

If a pivot angle of the mirror 104 is given as $\theta 2$, a beam shift amount r2 of the laser beams LB1 and LB2 upon operation of the mirror 104 is defined as follows:

$$r2 = 2\theta 2 L1 \qquad (2)$$

If the mirrors 103 and 104 are adjusted such that the value represented by equation (1) becomes equal to that by equation (2), ratio of the pivot angle $\theta 1$ to angle $\theta 2$ is given by:

$$\theta 2/\theta 1 = 1 + L2/L1 \qquad (3)$$

It is apparent from equation (3) that the degree of the adjustment effect of the laser beams LB1 and LB2 is determined by the ratio of the distance L2 to the distance L1. If the distance L2 is larger than the distance L1, the pivot angle of the mirror 104 must be larger than that of the mirror 103 so as to obtain identical beam shift amount.

By utilizing the above relationship to set the laser beams LB1 and LB2 to the reference position, coarse adjustment can be performed by the mirror 103, and fine adjustment can be performed by the mirror 104.

If the displayed positions on the display units 123 and 124 are deviated from the reference position and the optical axis, respectively, the operator causes the mirror 103 to pivot first to set the displayed position to the reference position according to coarse adjustment.

In this state, the operator operates the mirror 104 to align the displayed position on the display unit 123 with the optical axis according to fine adjustment.

Upon completion of fine adjustment, the position on the beam position sensor 120 is slightly deviated, and the mirrors 103 and 104 are operated again until the laser beam LB2 is incident on the reference position of the sensor 120, and the laser beam LB1 matches with the optical axis.

Figure 9:
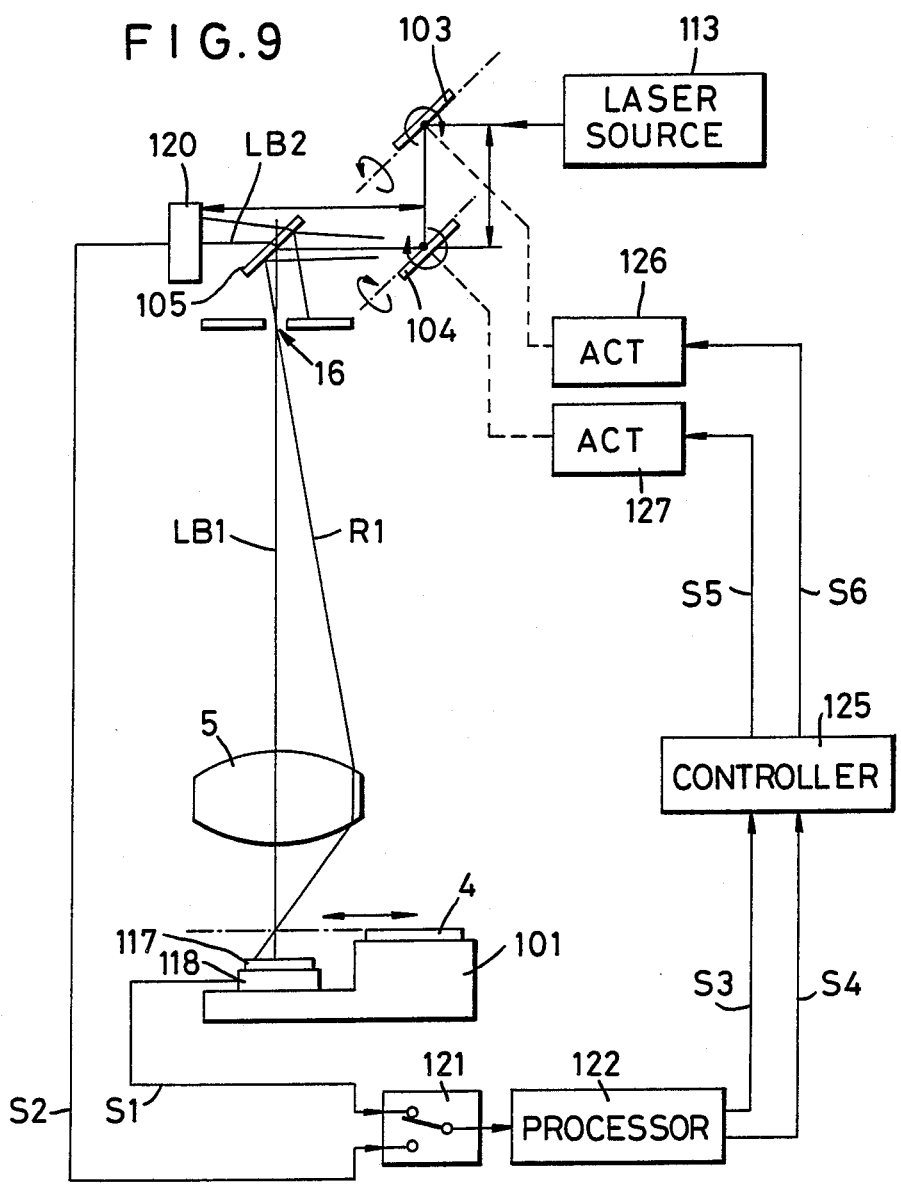
FIG. 9 is a schematic diagram showing a modification of the laser beam position adjustment device.

The adjustment apparatus in FIG. 7 may be constituted by an arrangment in FIG. 9 to perform automatic adjustment. More specifically, the signals S3 and S4 output from the processor 122 are input to a controller 125. The controller 215 calculates the rotational angles of the mirrors 103 and 104 and generates control signals S5 and S6. The control signals S5 and S6 drive drivers 126 and 127, respectively.

What is claimed is:

1. A machining apparatus with a laser beam, comprising:
   an energy beam source for generating an energy beam;
   a movable stage assembly on which a workpiece is placed;

an optical system for directing the energy beam toward the workpiece and forming a machining beam spot thereon;

means for setting a target machining position on the workpiece;

means for detecting a relative distance between the machining beam spot and the target machining position; and means for driving said movable stage assembly and said optical system in response to detection outputs from said detecting means, said stage assembly being moved to cause the workpiece to come close to the machining beam spot when the relative distance detected by said detecting means exceeds a predetermined distance, and said machining beam spot being moved to come close to the workpiece when the relative distance is shorter than the predetermined distance.

2. An apparatus according to claim 1, wherein said optical system includes means with an aperture for shaping the energy beam emitted from said energy beam source and an objective lens system having an optical axis passing through said aperture, and said driving means includes a first driver for shifting said objective lens system so as to shift the optical axis in order to move the machining beam spot.

3. An apparatus according to claim 2, wherein said optical system further includes means for adjusting an optical path of the energy beam such that the optical path of the energy beam passing through said aperture is aligned with the optical axis of said objective lens system.

4. An apparatus according to claim 3, wherein said adjusting means includes a beam deflector arranged between said energy beam source and said aperture and means for receiving the energy beam deflected by said beam deflector and for generating an output representing a position of the deflected energy beam.

5. An apparatus according to claim 4, wherein said adjusting means further includes means for displaying the position of the energy beam on the basis of the output from said energy beam position generating means.

6. An apparatus according to claim 4, wherein said adjusting means includes a beam deflector arranged between said energy beam source and said aperture, a first position sensor arranged at a position equivalent to said aperture to detect a position of the energy beam with respect to said aperture, a second position sensor arranged on said movable stage assembly to detect a position of the energy beam with respect to the optical axis of said objective lens system, and means for controlling said beam deflector in response to outputs from said first and second position sensors.

7. An apparatus according to claim 2, wherein said aperture is formed at a position conjugate with the workpiece with respect to said objective lens system.

8. An apparatus according to claim 2, wherein said driving means further includes a second driver for moving said movable stage assembly along a two-demensional direction parallel to a plane substantially perpendicular to the optical axis of said objective lens system.

9. An apparatus according to claim 8, wherein said driving means further includes control means for enabling said second driver when the relative distance exceeds the predetermined distance and for enabling said first driver and disabling said second driver when the relative distance is shorter than the predetermined distance.

10. An apparatus according to claim 8, wherein said driving means further includes means for controlling said second driver such that said movable stage assembly is moved according to speed characteristics representing a speed reduced to a predetermined speed while the relative distance is decreased when the relative distance exceeds the predetermined distance, and that said movable stage assembly is moved at a constant speed lower than the predetermined speed when the relative distance is shorter than the predetermined distance.

11. A machining apparatus with a laser beam, comprising:

an energy beam source for emitting an energy source;

a movable stage assembly on which a workpiece is placed;

an objective lens system, having an optical axis perpendicular to the workpiece, for focusing the energy beam to form a machining beam spot on the workpiece;

means for setting a target machining position on the workpiece;

means for relatively moving the workpiece and the machining beam spot to align the machining beam spot with the target machining position;

a member having an aperture through which the energy beam passes, said member being arranged between said energy beam source and said objective lens system to shape the energy beam; and means for adjusting an optical path of the energy beam such that the optical path of the energy beam passing through said aperture is aligned with an optical axis of said objective lens system.

12. An apparatus according to claim 11, wherein said adjusting means includes a beam deflector arranged between said energy beam source and said aperture, and means for receiving the energy beam deflected by said beam deflector and for generating an output representing a position of the deflected energy beam.

13. An apparatus according to claim 12, wherein said adjusting means further includes means for displaying the position of the energy beam on the basis of the output from said output generating means.

14. An apparatus according to claim 12, wherein said adjusting means includes a beam deflector arranged between said energy beam source and said aperture, a first position sensor arranged at a position equivalent to said aperture to detect a position of the energy beam with respect to said aperture, a second position sensor arranged on said movable stage assembly to detect a position of the energy beam with respect to the optical axis of said objective lens system, and means for controlling said beam deflector in response to outputs from said first and second position sensors.

* * * * *